United States Patent [19]
McVey et al.

[11] Patent Number: 6,108,100
[45] Date of Patent: Aug. 22, 2000

[54] APPARATUS AND METHOD FOR END-USER PERFORMANCE UPGRADE

[75] Inventors: John R. McVey, Boise; Mark A. Fahrenkrug, Meridian, both of Id.

[73] Assignee: Hewlett-Packard Company, Palo Alto, Calif.

[21] Appl. No.: 09/026,801

[22] Filed: Feb. 20, 1998

[51] Int. Cl.$^7$ .................................................. G06K 15/00
[52] U.S. Cl. ........................................... 358/1.16; 358/1.1
[58] Field of Search .................................... 358/1.1, 1.13, 358/1.16, 1.17, 1.11, 1.14, 523, 404, 444; 710/9, 13, 14, 72, 74; 711/1, 5, 115; 345/507, 508, 518

[56] References Cited

U.S. PATENT DOCUMENTS

| | | | |
|---|---|---|---|
| 4,491,910 | 1/1985 | Caudel et al. | 364/200 |
| 4,494,187 | 1/1985 | Simpson | 364/200 |
| 4,677,586 | 6/1987 | Magar et al. | 364/900 |
| 5,123,098 | 6/1992 | Gunning et al. | 395/400 |
| 5,137,379 | 8/1992 | Ukai et al. | 400/121 |
| 5,332,320 | 7/1994 | Ohara | 400/76 |
| 5,335,331 | 8/1994 | Murao et al. | 395/375 |
| 5,359,727 | 10/1994 | Kurita et al. | 395/550 |
| 5,410,641 | 4/1995 | Wakabayashi et al. | |
| 5,550,958 | 8/1996 | Hattori | 395/115 |

FOREIGN PATENT DOCUMENTS

| | | | |
|---|---|---|---|
| 0275510 | 7/1988 | European Pat. Off. | G07F 7/10 |
| 2214338A | 8/1989 | United Kingdom | B41J 29/00 |
| WO 82/01265 | 4/1982 | WIPO . | |

OTHER PUBLICATIONS

UK Patent Office Search Report.

*Primary Examiner*—Arthur G. Evans

[57] ABSTRACT

A printer including a memory configured to store executable code; a processor coupled to the memory and configured to execute executable code; a print mechanism coupled to the processor and configured to print an image in response to execution of executable code; a memory receptacle configured to removably receive a plug-in memory; and a memory controller configured to selectively write executable code onto a plug-in memory received by the memory receptacle. A method of operating an electronic device having a ROM including locations storing executable code, the locations having addresses, the electronic device further having a processor coupled to the memory and configured to execute executable code in locations at provided addresses, and a memory receptacle configured to receive an expansion memory unit including RAM having locations, the locations having addresses, the method comprising providing memory addresses to the processor, the memory addresses being for locations in the ROM; using the processor, executing executable code in locations at the addresses provided by the memory controller; determining if a user desires to use an expansion memory unit for data storage or for storing executable code; and copying executable program code from the ROM onto RAM in an expansion memory and switching from providing address locations in the ROM to address locations in the RAM, while the processor is executing executable code, if it is determined that a user desired to use an expansion memory unit for storing executable code.

20 Claims, 6 Drawing Sheets

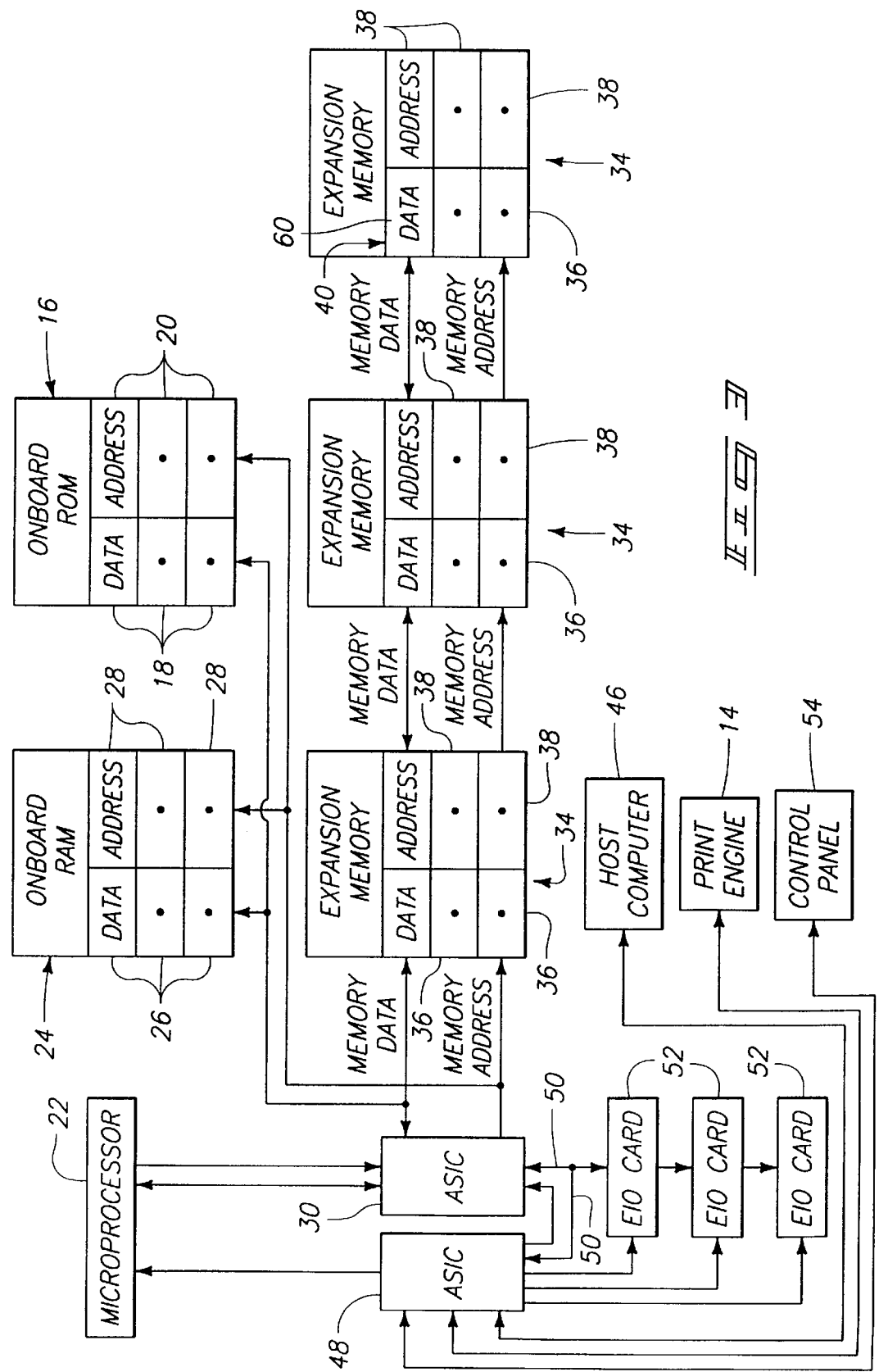

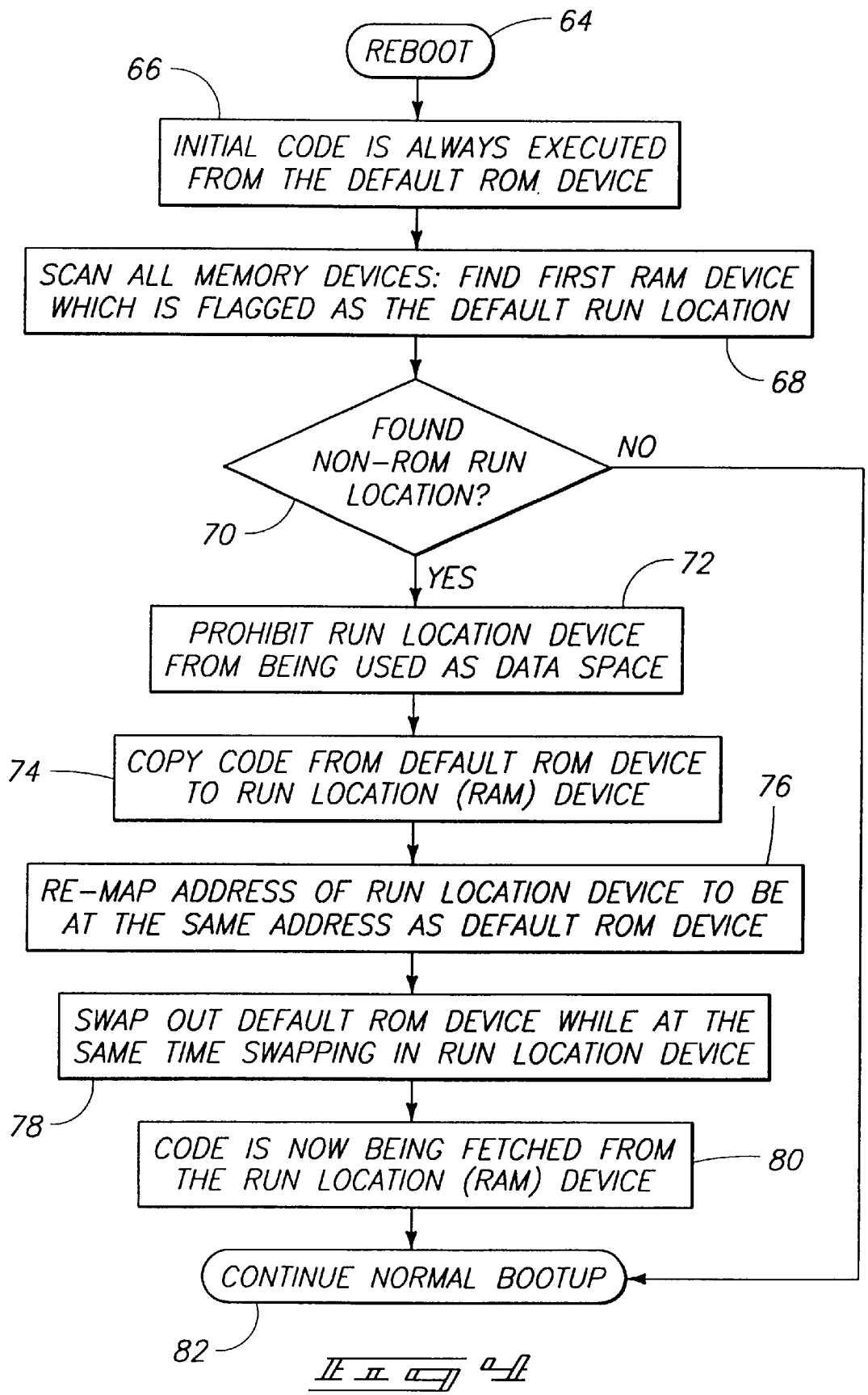

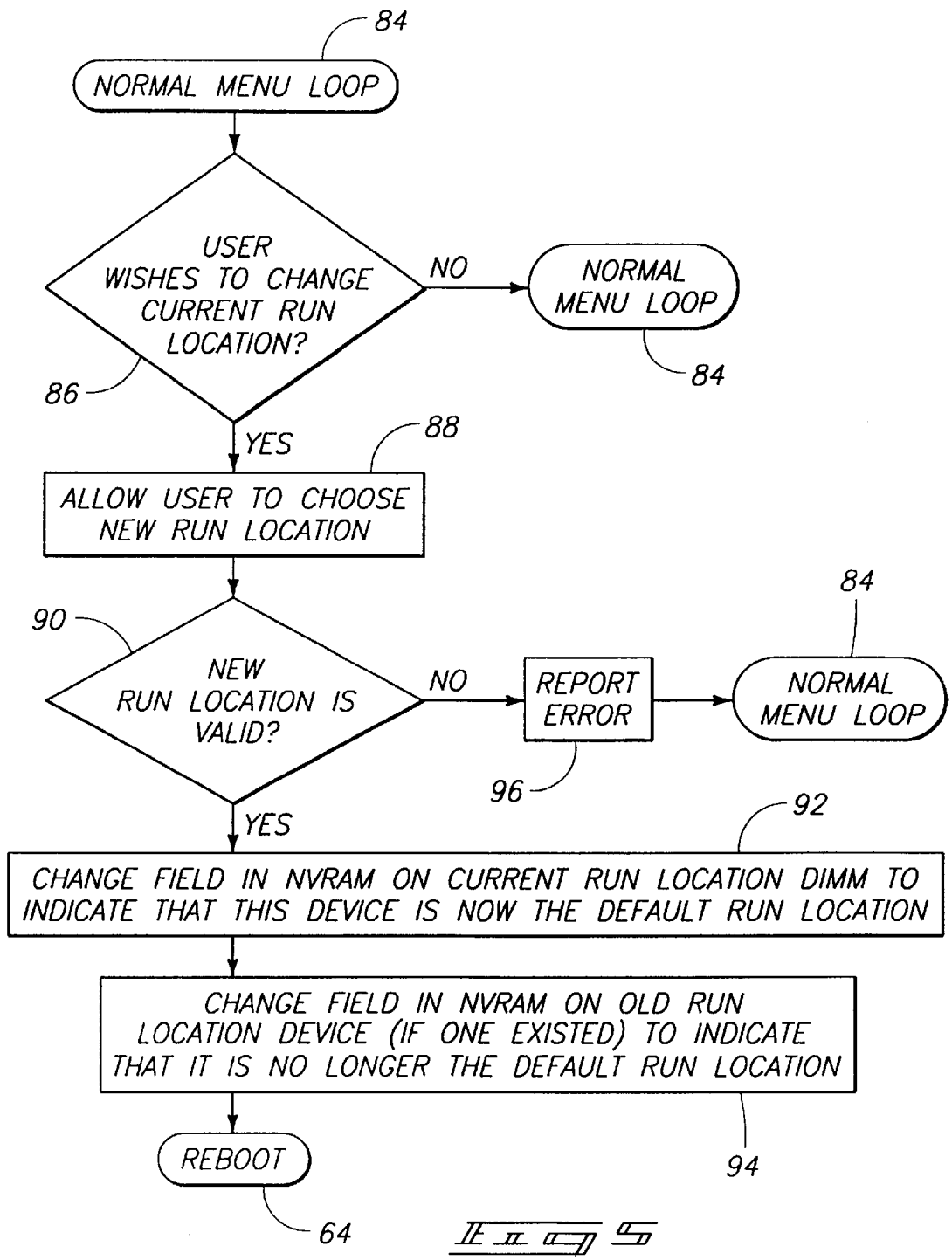

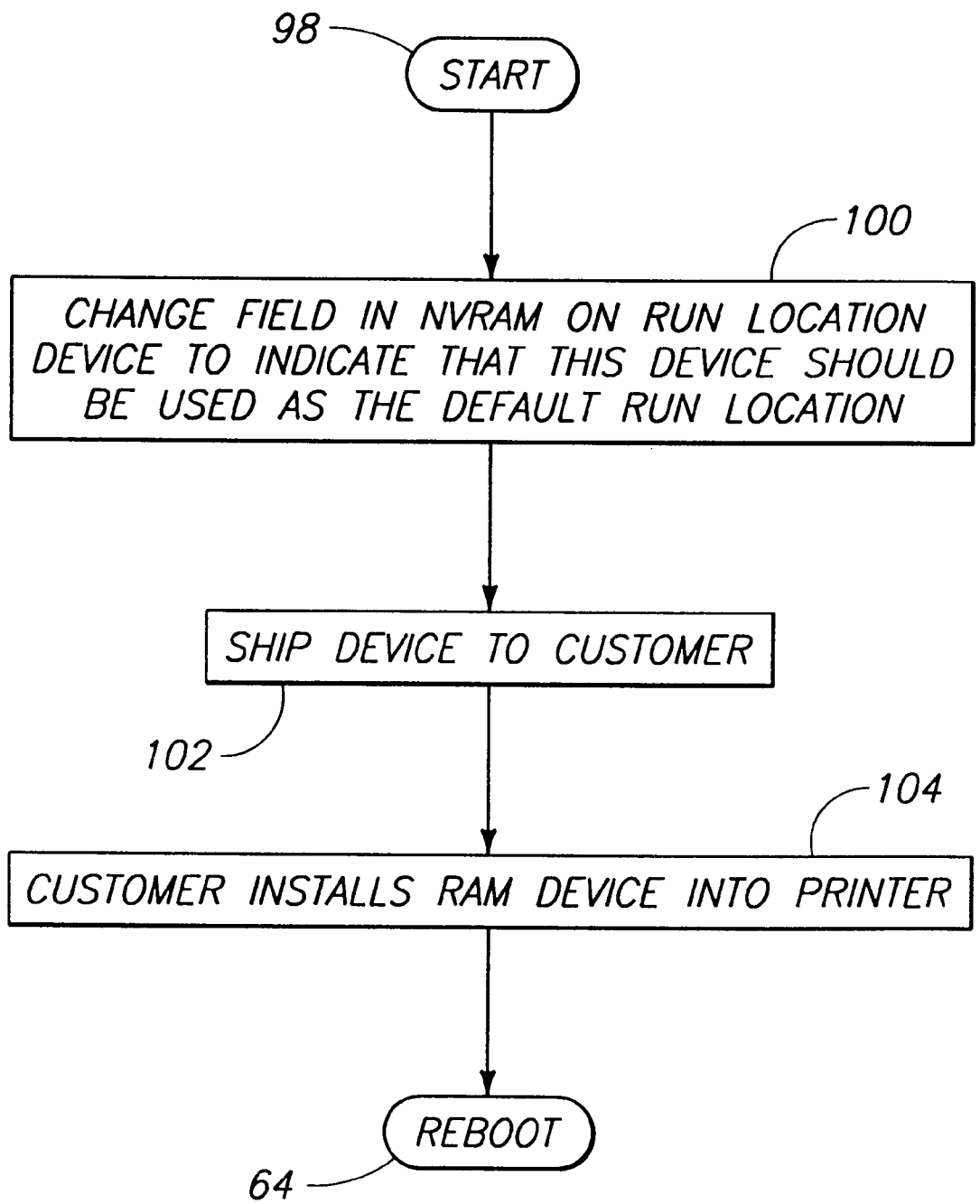

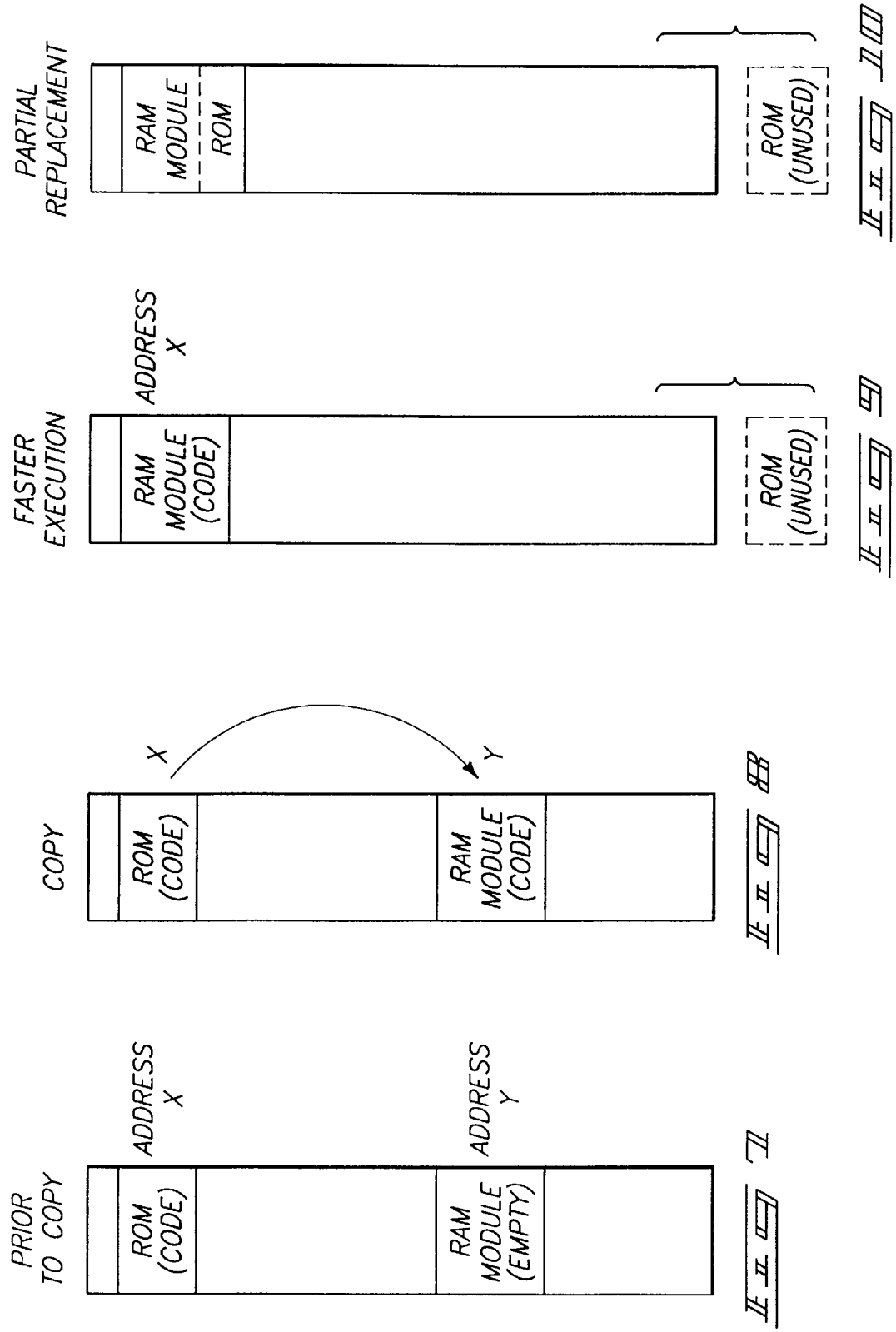

APPARATUS AND METHOD FOR END-USER PERFORMANCE UPGRADE

FIELD OF THE INVENTION

The invention relates to printers and other electronic devices. More particularly, the invention relates to printers and other electronic devices capable of receiving expansion memory and having embedded systems.

BACKGROUND OF THE INVENTION

Many electronic products are based on embedded microprocessor systems. Embedded systems typically run an application specific program (firmware) that is resident in factory installed memory. This memory is often mask read only memory (mask ROM) or erasable programmable read only memory (EPROM). System performance is often limited by how fast a central processing unit (CPU) can fetch instructions from this ROM or EPROM code memory. This ROM or EPROM has slower access times than expansion memory units that are presently available.

Prior solutions to embedded system performance problems include adding instructions caches for the CPU. These instruction caches are small buffer memories contained within the CPU or adjacent to the CPU. Caches can be made larger to improve performance, but large caches are costly. Ultimately, the embedded system is still performance limited by the speed of instruction memory during cache-misses and the system resource contention that results.

Another prior solution to embedded system performance problems involves using fast memory (such as SRAM, DRAM, or SDRAM) for instruction memory. Currently, all fast memory types are volatile, so some method must be provided to reload the application program (firmware) or the memory must be non-corruptible. Reloading the application program requires that a copy be provided in either mask ROM or through an I/O interface with the additional requirement of what is commonly known as "boot-ROM." Though not considered embedded systems, personal computers operate using a combination of these techniques. These techniques are typically not used in embedded controllers because of the additional cost and complexity of I/O interfaces. Without the ability to reload the application program, the volatile memory must be made non-corruptible after it has been programmed in the factory during manufacture. This requires battery backup which is costly and limits product life. Also, the program can become corrupted, such as by electrostatic discharge or by alpha particles.

It is known to provide plug-in memory receptacles in printers and other electronic devices to permit a customer to add extension memory. This memory is used for-additional data buffering. See, for example, U.S. Pat. No. 5,137,379 to Ukai et al. (incorporated herein by reference). The Ukai et al. patent discloses a printer including a cartridge mounted read only memory. The cartridge contains memory devices for storing data for at least one character font set and for storing the printing operation control program. The print operation control program and character font set data can be set by connecting an appropriate cartridge to the main body of the printer. The specifications for a printer can be changed to suit a host machine by merely changing a cartridge.

U.S. Pat. No. 5,332,320 to Ohara (incorporated herein by reference) discloses a printing apparatus with mode selection. A printing apparatus includes a ROM in which various programs are stored. A separate detachable ROM cartridge can be inserted into a slot. The cartridge includes an emulation executing unit and an emulation judgement unit. An emulation mode is selected automatically by inserting the emulation mode external memory cartridge.

With respect to printers, ROM is included which stores executable code for performing various functions. The printers are coupled to computers, such as personal computers, directly or via a network. A computer sends a page description language, such as PCL or PostScript to the printer. The executable code in the printer interprets or decodes the page description language to render an image on a page. This involves scaling of fonts, drawing lines (vectors), filling areas with patterns, combining page content with pre-existing forms or watermarks, etc. The interpretation of the page description language can also involve possible rotation or clipping of graphics and resolution conversions and enhancement. The interpretation of the page description language can also involve dithering (gray scaling) for images.

Certain printers, such as those available from the assignee of the present invention, have programmable memory controllers. These memory controllers provide for selectively changing an address map, indicating the location of code to be executed, even while the code is being executed.

SUMMARY OF THE INVENTION

The invention provides an electronic device comprising a memory configured to store executable code; a processor coupled to the memory and configured to execute executable code; a memory receptacle configured to removably receive a plug-in memory; and a memory controller configured to selectively write executable code onto a plug-in memory received by the memory receptacle. In one aspect of the invention, the electronic device comprises a printer including a print mechanism coupled to the processor and configured to render an image.

Another aspect of the invention provides an electronic device comprising a ROM including locations storing executable code, the locations having addresses; a processor coupled to the ROM and configured to execute executable code; a memory receptacle configured to removably receive and couple to the processor an expansion memory unit including RAM having locations, the locations having addresses, and including non-volatile memory, the non-volatile memory including a location defining a flag; and a memory controller configured to provide memory addresses to the processor, the processor executing executable code in locations at the addresses provided by the memory controller, the memory controller being configured to, in response to a control signal, copy executable program code onto the RAM in an expansion memory and to switch from providing address locations in the ROM to address locations in the RAM while the processor is executing executable code.

Another aspect of the invention provides a method of operating an electronic device having a ROM including locations storing executable code, the locations having addresses, the electronic device further having a processor coupled to the memory and configured to execute executable code in locations at provided addresses, and a memory receptacle configured to receive an expansion memory unit including RAM having locations, the locations having addresses, the method comprising providing memory addresses to the processor, the memory addresses being for locations in the ROM; using the processor, executing executable code in locations at the addresses provided by the memory controller; determining if a user desires to use an expansion memory unit for data storage or for storing executable code; and copying executable program code from the ROM onto RAM in an expansion memory and switching from providing address locations in the ROM to address locations in the RAM, while the processor is executing executable code, if it is determined that a user desired to use an expansion memory unit for storing executable code.

The invention allows a user to improve performance (after manufacture and purchase of the product) by installing a plug-in memory module which is used by the system for instruction fetch and execution instead of conventional uses such as data buffering. Because this is a user purchased and installed upgrade, it does not increase the factory cost of the product. The invention improves system performance regardless of the presence or size or instruction cache. In one aspect of the invention, instruction cache size is reduced, resulting in cost savings.

DESCRIPTION OF THE DRAWINGS

FIG. 3 is a block diagram illustrating hardware components of the electronic device of FIG. 1 as well as the expansion memory unit of FIG. 2 and a host computer that is coupled to the electronic device of FIG. 1.

FIG. 4 is a flowchart illustrating a modified boot-up process of the electronic device of FIG. 1.

FIG. 5 is a flowchart illustrating user selection of a particular run location for executable code executed by the electronic device of FIG. 1.

FIG. 6 is a flowchart illustrating pre-flagging an expansion memory unit to indicate that it should be used as a default run location for executable code.

FIG. 7 is a diagrammatic view illustrating addressing of a default ROM and an expansion memory unit prior to copying of executable code from the default ROM to the expansion memory unit.

FIG. 8 is a diagrammatic view illustrating copying of executable code from the default ROM to the expansion memory unit.

FIG. 9 is a diagrammatic view illustrating re-mapping of addresses.

FIG. 10 is a diagrammatic view illustrating partial re-mapping of addresses.

DETAILED DESCRIPTION OF THE INVENTION

Figure 1:
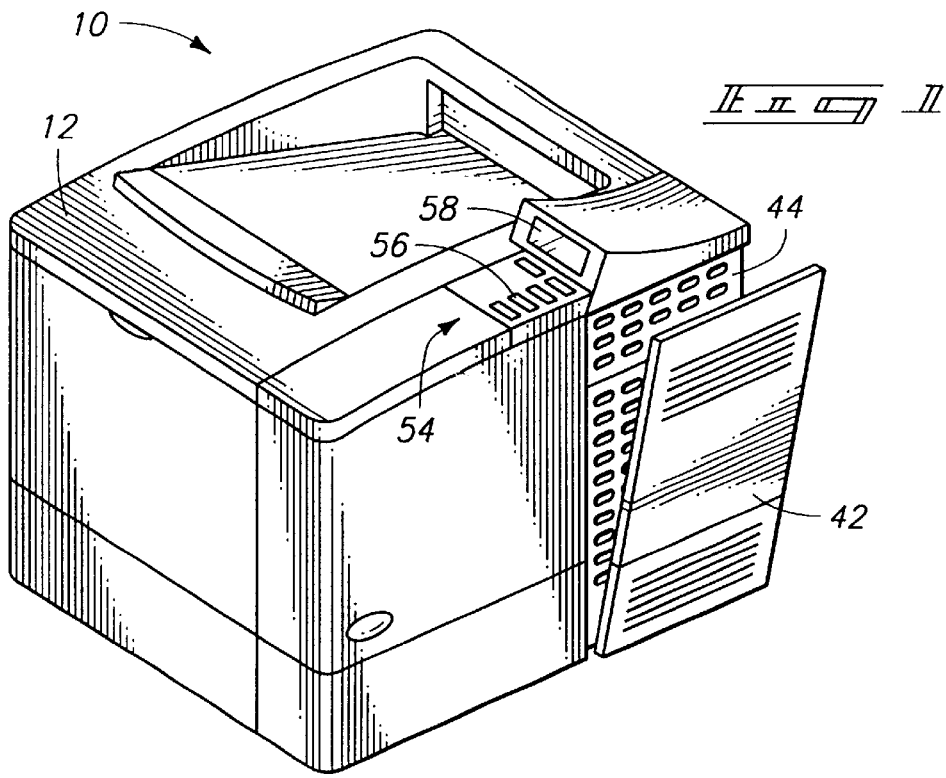
FIG. 1 is a perspective view of an electronic device embodying the invention.

FIG. 1 shows an electronic device 10 embodying the invention. In the illustrated embodiment, the electronic device is a printer; however, in alternative embodiments, the electronic device is a facsimile machine, scanner, plotter or other electronic device which includes memory. The invention has application to any electronic device having an embedded system as defined above. The printer 10 includes a housing 12, and a print mechanism or engine 14 (FIG. 3) in the housing. While other types of print mechanisms can be employed, in the illustrated embodiment, the print mechanism 14 is a laser print mechanism. The printer 10 further includes other components (not shown) typically included in a printer such as rollers, a toner dispenser, a laser head, a paper tray or trays, and a paper feed mechanism arranged in the housing 12 in a conventional manner.

The printer 10 includes an on-board or default ROM memory 16 (FIG. 3) including locations 18 storing executable code. The locations 18 have respective addresses 20. The printer 10 further includes an on-board RAM 24 having locations 26. The locations 26 have respective addresses 28. The printer further includes a processor 22 coupled to the memory 16 and which executes executable code. More particularly, the printer 10 further includes an application specific integrated circuit (ASIC) 30 coupled between the processor 22 and the memories 16 and 24. In one embodiment, the ASIC 30 defines a memory controller. The printer 10 is designed for use with a host computer 46. In another embodiment, the memory controller is included in the processor 22. The printer 10 further includes an ASIC 48 which provides a parallel connection between the host computer 46 and the processor 22. The print mechanism 14 is coupled to the processor 22 and renders an image.

While other busses can be employed, in the illustrated embodiment, the printer 10 includes a PCI local bus 50. The printer 10 may include one or more EIO cards 52 coupled to the ASICs 30 and 48 via the PCI local bus 50. EIO cards 52 are used for network connections, etc. The printer 10 further includes a control panel 54 (FIG. 1) including a keypad 56 for receiving various user selections, and a screen 58 for displaying messages.

Figure 2:
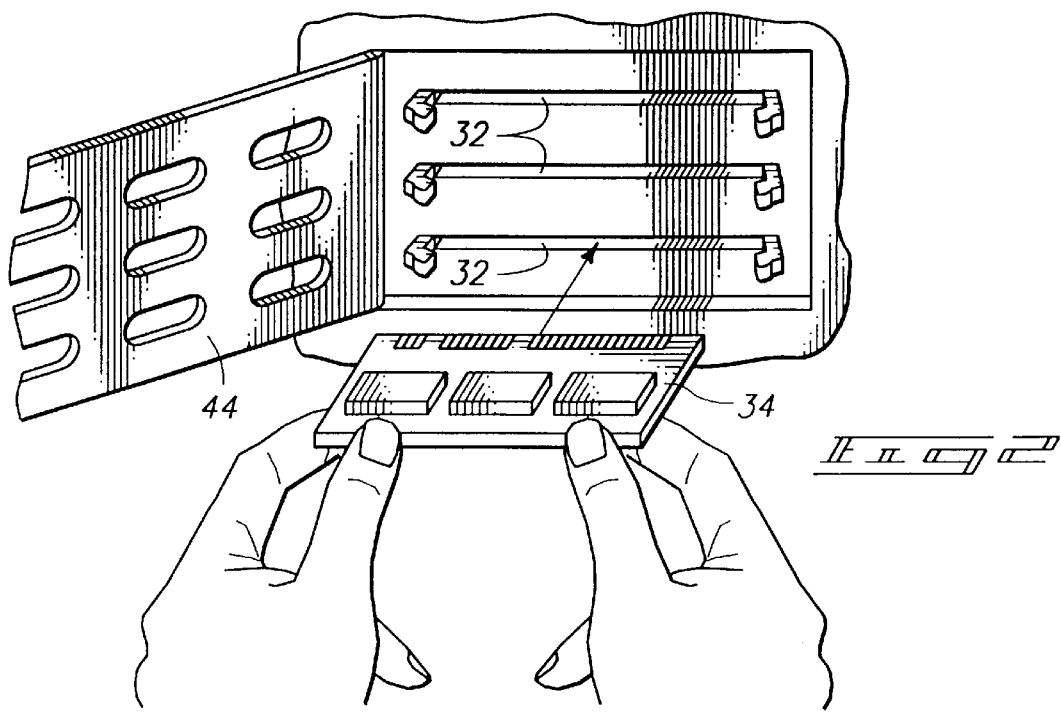
FIG. 2 is a perspective view illustrating an expansion memory unit being added to the electronic device of FIG. 1.

The printer 10 further includes one or more memory receptacles 32 (FIG. 2) configured to removably receive one or more expansion or plug-in memory units 34 and couple the expansion memory unit or units 34 to the processor 22. More particularly, in the illustrated embodiment, the receptacles 32 are dual inline memory module (DIMM) receptacles and the memory units 34 are DIMM units. The receptacles 32 are coupled to the processor 22 via the ASIC 30. The expansion memory unit 34 includes RAM having locations 36 (FIG. 3). The locations 36 have addresses 38. The expansion memory unit 34 further includes non-volatile memory 40. In the illustrated embodiment, the expansion memory unit 34 conforms to the JEDEC standard. In the illustrated embodiment, the expansion memory unit comprises an I2C interface EEPROM such as part number 24C02LM8 available from National Semiconductor. The JEDEC standard specifies the presence of the non-volatile memory 40 in the expansion memory unit 34. In the illustrated embodiment, the expansion memory unit 34 includes fast RAM, such as DRAM, EDO DRAM, or SDRAM, that is faster than the default ROM.

In the illustrated embodiment, the printer 10 includes a cover 42 (FIG. 1) which is removed by sliding it rearwardly to unlatch it, then pivoting open the top of the cover 42. Behind the cover 42 is an access door 44 (FIG. 2) which is pivotally opened after removing a screw. The receptacles 32 are found behind the access door 44.

The memory controller 30 provides memory addresses to the processor 22. The memory controller 30 is programmable. Memory controllers that are programmable exist in many printers produced by the assignee of the present invention. The memory controller 30 provides for dynamically changing the address map even while code is executing. This capability allows copying executable code to a new memory resource, namely an expansion memory unit 34, and then executing the code from the new memory resource without any address translations.

The printer includes boot-up code that resides in the ROM 16. The normal boot-up code performs a variety of functions such as enabling the processor's caches, initializing the PCI bus, setting up the base addresses of the various functional blocks within the ASICs, mapping in ROM and RAM devices, setting up timer prescalar registers, precharging and refreshing RAM, testing internal on-board RAM, scanning the keypad 56 of the control panel 54 for any special boot-up modes, putting a message on the screen 58 of the control panel 54 to let the user know that initialization is taking place, turning on the timer interrupt, initializing the MMU, ISRs, EIO, etc., polling dual in-line memory module slots for devices, executing run location code, sorting DIMMs by size, mapping in RAM as a contiguous block of memory, mapping in ROM as a contiguous block of memory, building a list of code entities that exist in the installed ROM, starting tasks in the operating system, and beginning multitasking.

The processor 22 executes executable code in locations at the addresses provided by the memory controller 30. The memory controller 30, in response to a control signal, copies executable program code from the default ROM 16 onto the RAM in the expansion memory 34 and switches from providing addresses 20 to locations 18 in the ROM to addresses 38 to locations 36 in the RAM in the expansion memory 34 (switches run locations). In the illustrated embodiment, the copying takes place while the processor 22 is executing executable code. The memory controller 30 uses RAM in the expansion memory 34 for data storage unless the control signal is provided, in which case at least a portion of the RAM in the expansion memory 34 is used for storing executable code. In one embodiment, this control signal is provided via the control panel 54, from the host computer 46, or from a local area network connection. To provide this capability, boot-up code that resides on non-volatile ROM memory is modified to contain these instructions. The boot-up code is modified as will be described below in connection with FIG. 4.

In one embodiment, everything is copied from the default ROM 16 to the RAM in the expansion memory 34 in response to the control signal. The copying takes place every time the printer 10 is rebooted (e.g., every time there is a power interruption or the printer is turned on after having been off) if the control signal is present. In the illustrated embodiment, each expansion memory unit 34 is a RAM bank. The RAM bank must be large enough to hold the copy of the code from the ROM 16. In one embodiment, more than one expansion memory unit (RAM bank) 34 is used for holding the copy of the executable code. After the copying, the memory controller 30 swaps this RAM bank 34 into the same address space where the default ROM 16 used to reside. In other words, from the point of view of the processor 22, the underlying executable code has not changed other than the fact that it no longer takes as long to fetch code (e.g. into an instruction cache of the processor 22).

In another embodiment, not all executable code is copied from the default ROM 16 to the RAM in the expansion memory unit 34. In this embodiment, frequently used code is copied into the expansion memory unit 34. For example, an electronic device may have a large quantity of executable code, but only ten percent of that code is executed ninety percent of the time. In this embodiment, a speed advantage can be gained by only copying the smaller block of code into the RAM in the expansion memory unit 34 and then mapping out just that smaller block of the default ROM for the faster RAM.

Thus, the invention allows a user to add a fast plug-in memory unit 34 and use it for code execution instead of a more conventional use, such as for additional data buffering. The user can also decline to use the plug-in memory unit 34 for code execution and can instead use the plug-in memory unit 34 in a conventional manner, for data buffering.

In order to save or preserve the code execution mode (e.g. whether code is to be executed from the default memory 16 or the expansion memory unit 34), the current execution mode is saved in some non-volatile memory. In one embodiment, the current execution mode is saved in the non-volatile memory 40 that exists in the expansion memory unit 34 itself. Thus, the non-volatile memory 40 includes a location 60 defining a flag which, when set, indicates that the expansion memory unit 34 is to be used for storing executable code. An advantage of this embodiment is that it is possible to pre-flag an expansion memory unit 34 so that, as soon as the expansion memory unit 34 is installed, the printer 10 immediately recognizes that this expansion memory unit 34 instead of the default ROM 16 should be used for code execution. All or part of the executable code is then copied from the default mask ROM 16 to the user designated fast expansion memory unit 34. After the executable code is copied, the expansion memory unit 34 is re-mapped to replace all or part of the default (slower) memory 16. In this embodiment, the control signal is generated in response to insertion of an expansion memory 34 having the flag set.

FIG. 4 is a flowchart illustrating how the normal boot-up procedure is modified for use with such pre-flagged expansion memory units 34.

At step 64, after a pre-flagged expansion memory unit 34 is installed, a user initiates a re-booting of the printer 10.

After step 64, in step 66, initial code is always executed from the default ROM 16. This initial code is for enabling the processor's caches, initializing the PCI bus, setting up the base addresses of the various functional blocks within the ASICs, mapping in ROM and RAM devices, setting up timer prescalar registers, precharging and refreshing RAM, testing internal on-board RAM, scanning the keypad 56 of the control panel 54 for any special boot-up modes, putting a message on the screen 58 of the control panel 54 to let the user know that initialization is taking place, turning on the timer interrupt, initializing the MMU, ISRs, EIO, etc. After performing step 66, the processor proceeds to step 68.

In step 68, the processor scans all memory devices and finds the first expansion memory unit 34 which is flagged as being the default run location. After performing step 68, the processor proceeds to step 70.

In step 70, the processor determines whether a pre-flagged expansion memory unit 34 run location was found. If so, the processor proceeds to step 72. If not, the processor proceeds to step 82.

In step 72, the processor prohibits the run location device 34 from being used as data space. After performing step 72, the processor proceeds to step 74.

In step 74, the processor copies code from the default ROM 1 6 to the run location device 34. After performing step 74, the processor proceeds to step 76.

In step 76, the processor re-maps the address of the run location device 34 to be at the same address as the default ROM 16. After performing step 76, the processor proceeds to step 78.

In step 78, the processor swaps out the default ROM 1 6 while at the same time swapping in the run location device 34. After performing step 78, the processor proceeds to step 80.

In step 80, the processor fetches code from the run location device 34. After performing step 80, the processor proceeds to step 82.

In step 82, the processor resumes the normal boot-up process. For example, the processor builds a list of code entities that exist in the installed ROM, starts tasks in the operating system, and begins multitasking. Normal operation takes place after boot-up except that the expansion memory unit 34 is used for executable code. In the preferred embodiment, use of the expansion memory unit 34 as the new run location allows the printer 10 to fetch code into the processor 22 at a rate faster than from the default ROM 16.

FIG. 5 illustrates steps involved in changing the run location. Occasionally, the user will want to change the run location. For example, the RAM in the expansion memory unit 34 dedicated to holding the copy of the executable code may occasionally be more useful as data space. In this case, the user may want to change the run location back to the default ROM 16. Another possible scenario is that the user has obtained some new off-the-shelf expansion memory units and now wishes to dedicate one of these new memory units as the new run location.

After boot-up, the processor 22 enters in a normal menu loop and periodically scans for user commands.

In step 86, the processor 22 determines whether the user wishes to change the current run location. If so, the processor proceeds to step 88. If not, the processor returns to the normal menu loop 84.

In step 88, the processor 22 inputs the new run location from the user, such as via the keypad 56. After performing step 88, the processor proceeds to step 90.

In step 90, the processor 22 verifies that the new run location is valid. For example, the processor makes sure the new run location comprises RAM, checks the size of the RAM to ensure there is enough room for the executable code or portion of the executable code that is to be copied, etc. If so, the processor proceeds to step 92. If not the processor proceeds to step 96.

In step 92, the processor 22 changes a field or location 60 in nonvolatile RAM on the selected run location expansion memory 34 to indicate that this expansion memory 34 is now the default run location. After performing step 92, the processor proceeds to step 94.

In step 94, the processor 22 changes a field or location 60 in nonvolatile RAM on the expansion memory 34 that was used as the run location, if there was another expansion memory 34 that was used as the run location, to indicate that this expansion memory 34 is no longer the default run location. After performing step 94, a reboot is initiated in step 64.

In step 96, the processor 22 reports to the user that an error has been detected (e.g., the desired run location does not include RAM, the desired run location is not sufficiently large in size, etc.). After performing step 96, the processor returns to the normal menu loop 84.

FIG. 6 illustrates a method of pre-flagging expansion memory units 34. It is possible for a manufacturer or distributor of the electronic devices to pre-flag memory expansion units 34 as being the default run location. For example, a customer may complain that system performance is too slow. In this case, the manufacturer could ship a fast expansion memory unit 34 that is pre-flagged as the default run location. When the customer receives the expansion memory unit 34, they can simply install the new expansion memory unit 34 and reboot to immediately realize system performance improvements.

In step 98, a process to pre-flag an expansion memory unit 34 is initiated.

In step 100, a manufacturer pre-flags an expansion memory unit 34 as being the default run location. This is done by changing the field defining the flag 60 in nonvolatile RAM of the expansion memory unit 34 to indicate that this memory unit 34 should be used as the default run location. After performing step 100, the manufacturer performs step 102.

In step 102, the manufacturer ships the pre-flagged expansion memory unit 34 to a customer. After the manufacturer performs step 102, the customer performs step 104.

In step 104, the customer installs the pre-flagged expansion memory unit into the printer or other electronic device 10. After performing step 104, the customer re-boots the printer or other electronic device 10.

The executable code in the default ROM has a starting address X and the empty area in expansion memory to which executable code is to be copied has a starting address Y (FIG. 7). Assuming it is desired to copy executable code to an expansion memory (either pre-flagged or user selected), there are two possible ways of accessing the code that is in the expansion memory. Because the code in the expansion memory and is not dynamically relocatable (in terms of the memory addresses referenced by that code), jumps and branches in the code would point to incorrect addresses in the default ROM, not to addresses of copied code in the expansion memory. Therefore, in one embodiment, address translations are performed.

In the embodiment illustrated in FIG. 4, however, the copying is not autonomous. The copy operation is a part of the executable code in the default ROM. More particularly, executable code is first physically copied into the expansion memory (FIG. 8), then addresses are re-mapped (FIG. 9). In other words, the code copied into the expansion memory is given addresses starting at address X, where the executable code in the default ROM used to reside. The default ROM is unused. The code is physically present on the expansion memory, but is given addresses as if it were in the default ROM. FIG. 10 illustrates an alternative embodiment, discussed above, where only a portion of the executable code is copied to the expansion memory. In this embodiment, only that code in expansion memory is given addresses where the executable code in the default ROM used to reside. The addresses of the portion of executable code that is not copied to the expansion memory are left unchanged.

The invention allows a user to have control over whether their extension RAM devices are used for data buffering or code execution. If a user requires fast code execution, the user can select (e.g., by a control panel, host computer, or LAN connection) configuration of RAM memory to be used for code execution.

In some cases, code execution does not present an unacceptable bottleneck to the user. Some products are limited by the speed of their incoming or outgoing data channels. In such cases, it may be more desirable to the user to configure the RAM memory to be used for data buffering. This ability to select how extension memory is used provides a level of user control which has not been provided in the past.

In addition, because memory devices can be pre-flagged as being used as locations for code execution rather than just for data buffering, users can realize immediate performance improvements by simply installing such a pre-flagged memory device. No complicated user setup or configuration procedures are necessary. Because this is a user purchased and installed upgrade, factory costs of manufacturing the product are not increased.

The invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A printer comprising:

a memory configured to store executable code;

a processor coupled to the memory and configured to execute executable code;

a print mechanism coupled to the processor and configured to print an image in response to execution of executable code;

a memory receptacle configured to removably receive a plug-in memory; and a memory controller configured to selectively write executable code onto a plug-in memory received by the memory receptacle.

2. A printer in accordance with claim 1 wherein the processor includes the memory controller.

3. A printer in accordance with claim 1 wherein, in response to insertion of a plug-in memory into the receptacle, the memory controller copies executable code from the first mentioned memory to the plug-in memory and the processor executes executable code from the plug-in memory.

4. A printer in accordance with claim 1 and further comprising a plug-in memory in the receptacle, and wherein the processor executes executable code from the plug-in memory.

5. A printer in accordance with claim 1 and further comprising a plug-in memory in the receptacle, wherein the plug-in memory comprises EDO DRAM.

6. A printer in accordance with claim 1 and further comprising a plug-in memory in the receptacle, wherein the plug-in memory comprises SDRAM.

7. A printer in accordance with claim 1 and further comprising a plug-in memory in the receptacle, wherein the plug-in memory comprises memory that is faster than the first mentioned memory.

8. A printer in accordance with claim 1 wherein the memory controller is configured to provide memory address locations to the processor, wherein the processor is configured to execute executable code at address locations provided by the memory controller, and wherein memory controller is capable of changing from providing address locations in the first mentioned memory to address locations in a plug-in memory while the processor is executing executable code.

9. A printer in accordance with claim 1 and further comprising a plug-in memory in the receptacle, wherein the memory controller provides memory address locations to the processor, wherein the processor is configured to execute executable code at address locations provided by the memory controller, and wherein the memory controller is configured to switch from providing address locations in the first mentioned memory to address locations in the plug-in memory while the processor is executing executable code from the first mentioned memory.

10. A printer in accordance with claim 1 and further including a mode selector using which a user can select from a mode wherein the processor executes executable program code from a plug-in memory and a mode wherein the processor executes executable code from the first mentioned memory.

11. An electronic device comprising:

a ROM including locations storing executable code, the locations having addresses;

a processor coupled to the ROM and configured to execute executable code;

a memory receptacle configured to removably receive and couple to the processor an expansion memory unit including RAM having locations, the locations having addresses, and including non-volatile memory, the non-volatile memory including a location defining a flag; and a memory controller configured to provide memory addresses to the processor, the processor being configured to execute executable code in locations at the addresses provided by the memory controller, the memory controller being configured to, in response to a control signal, copy executable program code onto the RAM in an expansion memory unit, from the ROM, and to switch from providing address locations in the ROM to address locations in the RAM while the processor is executing executable code.

12. An electronic device in accordance with claim 11 wherein the memory controller is configured to use RAM in an expansion memory for data storage unless the control signal is provided, in which case at least a portion of the RAM is used for storing executable code.

13. An electronic device in accordance with claim 11 and further comprising an expansion memory, wherein the expansion memory further includes non-volatile memory including a location defining a flag which, when set, indicates that the expansion memory is to be used for storing executable code, and wherein the control signal is generated in response to the flag of the expansion memory being set.

14. An electronic device in accordance with claim 11 and further comprising an expansion memory, wherein the expansion memory further includes non-volatile memory including a location defining a flag which, when set, indicates that the expansion memory is to be used for storing executable code, and wherein the control signal is generated in response to insertion of an expansion memory having the flag set.

15. An electronic device in accordance with claim 11 and further comprising a print mechanism coupled to the processor and configured to render an image.

16. An electronic device in accordance with claim 15 and further comprising an expansion memory in the receptacle, wherein the RAM is faster than the ROM.

17. A method of operating an electronic device having a ROM including locations storing executable code, the locations having addresses, the electronic device further having a processor coupled to the memory and configured to execute executable code in locations at provided addresses, and a memory receptacle configured to receive an expansion memory unit including RAM having locations, the locations having addresses, the method comprising:

providing memory addresses to the processor, the memory addresses being for locations in the ROM;

using the processor, executing executable code in locations at the addresses provided by the memory controller;

determining if a user desires to use an expansion memory unit for data storage or for storing executable code; and copying executable program code from the ROM onto RAM in an expansion memory and switching from providing address locations in the ROM to address locations in the RAM, while the processor is executing executable code, if it is determined that a user desired to use an expansion memory unit for storing executable code.

18. A method of operating an electronic device in accordance with claim 17 wherein the determining comprises checking the status of a flag on the expansion memory.

19. A method of operating an electronic device in accordance with claim 17 wherein the expansion memory comprises non-volatile memory and whether the determining comprises checking the status of a flag in the non-volatile memory.

20. A method of operating an electronic device in accordance with claim 17 and further comprising inserting into the receptacle an expansion memory including non-volatile memory having a location defining a flag, and wherein the determining comprises checking the status of the flag.

* * * * *